(12) United States Patent
Huang et al.

(10) Patent No.: US 8,981,968 B2
(45) Date of Patent: Mar. 17, 2015

(54) USER-DEFINED PAGES FOR AIRCRAFT

(75) Inventors: Cindy Chi-Lan Huang, Seattle, WA (US); Eduardo Raul Cajavilca, Houston, TX (US)

(73) Assignee: The Boeing Company, Chicago, IL (US)

( * ) Notice: Subject to any disclaimer, the term of this patent is extended or adjusted under 35 U.S.C. 154(b) by 633 days.

(21) Appl. No.: 13/302,177

(22) Filed: Nov. 22, 2011

(65) Prior Publication Data

US 2013/0021173 A1 Jan. 24, 2013

Related U.S. Application Data

(60) Provisional application No. 61/510,746, filed on Jul. 22, 2011.

(51) Int. Cl.
*G08B 21/00* (2006.01)
*G01D 7/08* (2006.01)
*G06F 3/14* (2006.01)

(52) U.S. Cl.
CPC ... *G01D 7/08* (2013.01); *G06F 3/14* (2013.01)
USPC .............. 340/971; 340/945; 340/973; 701/14

(58) Field of Classification Search
USPC ................. 340/945, 971, 461, 439, 973–975; 701/14
See application file for complete search history.

(56) References Cited

U.S. PATENT DOCUMENTS

| | | | | |
|---|---|---|---|---|
| 5,732,368 A | * | 3/1998 | Knoll et al. | 701/1 |
| 6,667,726 B1 | * | 12/2003 | Damiani et al. | 345/1.1 |
| 6,842,677 B2 | * | 1/2005 | Pathare | 701/36 |
| 7,069,261 B2 | | 6/2006 | Ahl et al. | |
| 7,142,131 B2 | | 11/2006 | Sikora | |
| 7,580,235 B2 | | 8/2009 | Hamasaki et al. | |
| 2003/0187823 A1 | | 10/2003 | Ahl et al. | |
| 2004/0004557 A1 | | 1/2004 | Sikora | |
| 2004/0210847 A1 | * | 10/2004 | Berson et al. | 715/788 |
| 2007/0142980 A1 | | 6/2007 | Ausman et al. | |
| 2009/0174537 A1 | * | 7/2009 | Rovik et al. | 340/438 |
| 2013/0009792 A1 | * | 1/2013 | Shafaat | 340/979 |

OTHER PUBLICATIONS

PCT search report dated May 4, 2012 regarding application PCT/US2012/022562, filing date Jan. 25, 2012, applicant The Boeing Company, 11 Pages.
International Preliminary Report on Patenability dated Jan. 28, 2014, regarding Application No. PCT/US2012/022562, 7 pages.

* cited by examiner

*Primary Examiner* — Brent Swarthout
(74) *Attorney, Agent, or Firm* — Yee & Associates, P.C.

(57) ABSTRACT

A method and apparatus for displaying aircraft information. A selection of a piece of dynamic information is detected about an aircraft on a first display on a user interface. The piece of dynamic information is used to operate the aircraft and changes during operation of the aircraft. The piece of dynamic information selected from the first display is added to a custom display on the user interface. The custom display is displayed on the user interface on a display system for the aircraft.

18 Claims, 11 Drawing Sheets

USER-DEFINED PAGES FOR AIRCRAFT

RELATED PROVISIONAL APPLICATION

This application is related to and claims the benefit of priority of provisional U.S. Patent Application Ser. No. 61/510,746, filed Jul. 22, 2011, entitled "User-Defined Pages for Aircraft", which is incorporated herein by reference.

BACKGROUND INFORMATION

1. Field

The present disclosure relates generally to displaying aircraft information and, in particular, to a method and apparatus for defining pages for information about an aircraft.

2. Background

Aircraft include many different systems that operate during the flight of an aircraft. For example, an aircraft may have a computer system, a hydraulic system, a fuel system, an environmental system, and/or other suitable systems. These different systems generate information during the operation of the aircraft. This type of information often changes during the operation of the aircraft. For example, the airspeed of an aircraft will change during different phases of flight of the aircraft. As another example, as an aircraft operates, fuel consumption and the level of fuel in the aircraft also changes. This type of information that changes during the operation of the aircraft may be referred to as dynamic information.

This dynamic information is displayed on a display system for the computer system on the aircraft. For example, the computer system may display a primary flight display, a multifunction display, an engine indicating and crew alerting system (EICAS) display, and/or other suitable types of displays on the display system. Information about the operation of different systems on aircraft is often displayed on the multifunction display.

These different displays are part of a user interface that allows an operator to see dynamic information about the different systems. Typically, each of these displays is displayed on a different display device from other displays.

In other words, each display for a particular system in the aircraft may be displayed on its own display device. For example, one display on a first display device may provide information about the environmental system, while another display on a second display device provides information about engine operation.

An operator may view this dynamic information to monitor the operation of the different systems in the aircraft. Further, the operator may interact with the displays to store information for later use. For example, if the revolutions per minute or temperature values are greater than desired, an alert may occur. The display system may have a functionality that allows the operator to store these values at the time the alert occurs for future review in maintenance after the flight of the aircraft.

When a limited number of display devices are available in a display system for displaying different information about the aircraft, an operator may view the information for different systems by selecting the displays that the operator wants to view. Moving from one display to another display, however, may sometimes be more time consuming than desired.

Thus, it would be advantageous to have a method and apparatus that takes into account at least some of the issues discussed above, as well as possibly other issues.

SUMMARY

In one advantageous embodiment, a method for displaying aircraft information is provided. A selection of a piece of dynamic information is detected about an aircraft on a first display on a user interface. The piece of dynamic information is used to operate the aircraft and changes during operation of the aircraft. The piece of dynamic information selected from the first display is added to a custom display on the user interface. The custom display is displayed on the user interface on a display system for the aircraft.

In another advantageous embodiment, an apparatus comprises a display system for an aircraft and a computer system. The computer system is configured to detect a selection of a piece of dynamic information about an aircraft on a first display on a user interface. The piece of dynamic information is used to operate the aircraft and changes during operation of the aircraft. The computer system is further configured to add the piece of dynamic information selected from the first display to a custom display on the user interface. The computer system is further configured to display the custom display on the user interface on the display system for the aircraft.

In yet another advantageous embodiment, a custom display system for an aircraft comprises a display system for the aircraft and a computer system. The computer system is configured to detect a selection of a piece of dynamic information about an aircraft on a first display on a user interface. The piece of dynamic information is used to operate the aircraft and changes during operation of the aircraft. The computer system is further configured to add the piece of dynamic information selected from the first display to a custom display on the user interface. A number of pieces of dynamic information about the aircraft from a number of different displays is present in the custom display in addition to the piece of dynamic information from the first display. The computer system is further configured to identify a set of functions for the piece of dynamic information. The computer system is further configured to add the set of functions to the custom display. The computer system is further configured to display the custom display on the user interface on the display system for the aircraft.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

The different advantageous embodiments recognize and take into account a number of different considerations. For example, the different advantageous embodiments recognize and take into account that, oftentimes, an operator may desire to see information for more than one aircraft system at the same time. Further, an operator may desire to see information that is located on more than one display. The different advantageous embodiments recognize and take into account that this information may be dynamic information about the aircraft. In other words, the information may change during operation of the aircraft.

Additionally, the different advantageous embodiments recognize and take into account that an operator may need to view dynamic information generated by different systems during operation of the aircraft. As a result, the operator may need to move between displays on a display device at a rate that may be higher than desired when only that single display device is used for viewing the dynamic information.

The different advantageous embodiments recognize and take into account that moving between displays to see information about the aircraft may be more time consuming than desired. The different advantageous embodiments recognize and take into account that adding additional display devices is one solution. The different advantageous embodiments also recognize and take into account that the amount of space within the aircraft may limit the number of display devices that may be present in a display system for an aircraft. Further, additional display devices add weight and cost to the aircraft.

The different advantageous embodiments recognize and take into account that one solution involves displaying different displays in different windows on the same display device. The different advantageous embodiments recognize and take into account that in some cases, the size of the display devices may reduce the readability of the information being displayed in the different windows on the display device when multiple windows are displayed at the same time.

Thus, the different advantageous embodiments provide a method and apparatus for displaying aircraft information. In one advantageous embodiment, a selection of a piece of dynamic information about an aircraft on a first display in a user interface is detected. The piece of dynamic information is used to operate the aircraft and changes during the operation of the aircraft. The piece of dynamic information selected from the first display is added to a custom display in the user interface. The custom display is displayed in the user interface on a display system for the aircraft.

Figure 1:
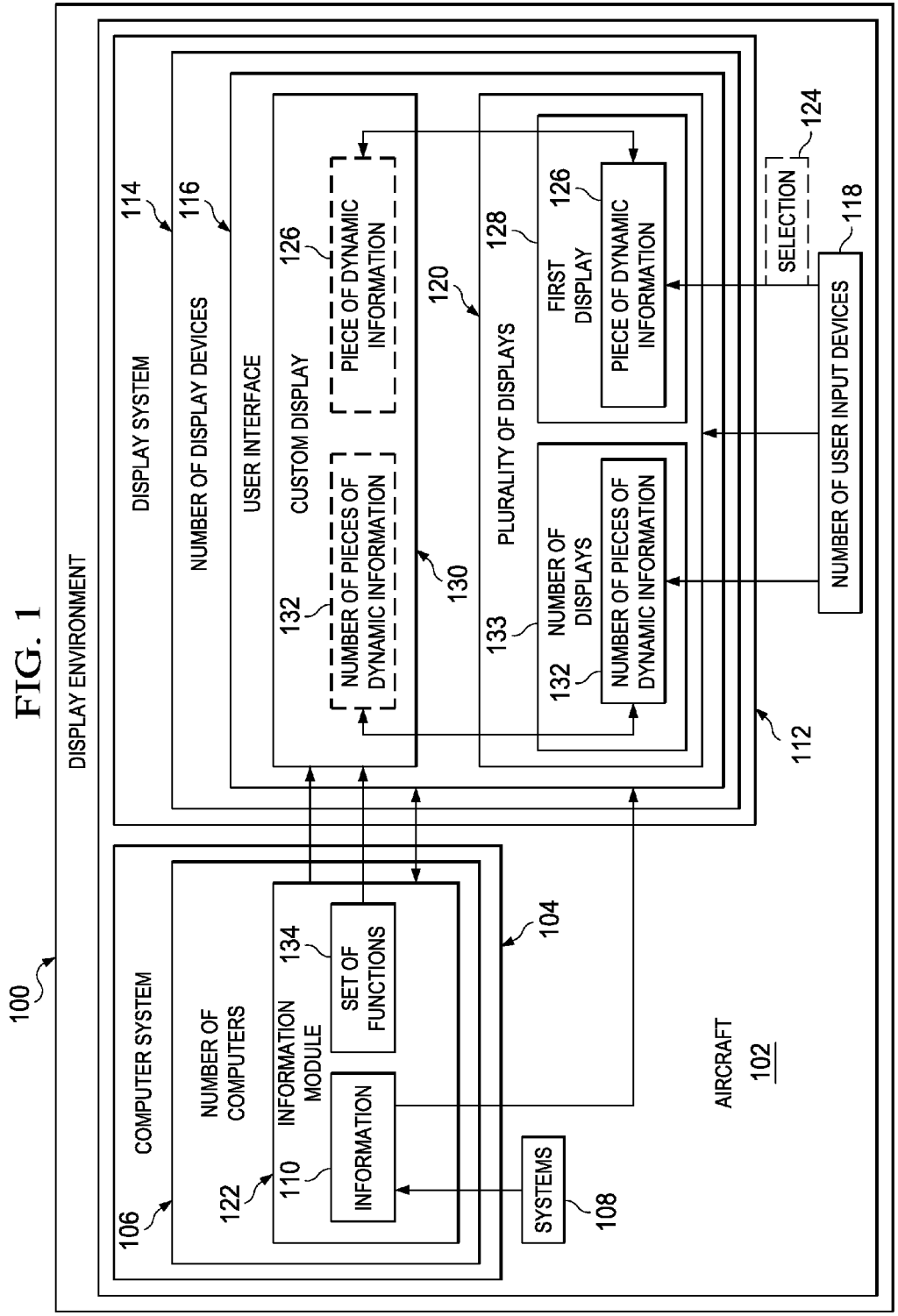
FIG. 1 is an illustration of a display environment in the form of a block diagram in accordance with an advantageous embodiment.

With reference next to the figures and, in particular, with reference to FIG. 1, an illustration of a display environment in the form of a block diagram is depicted in accordance with an advantageous embodiment. Display environment 100 includes aircraft 102 and computer system 104. Computer system 104 is associated with aircraft 102 in these illustrative examples.

This association is a physical association in these depicted examples. A first component, such as computer system 104, may be considered to be associated with a second component, such as aircraft 102, by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

In these illustrative examples, computer system 104 is hardware and comprises number of computers 106. When more than one computer is present in number of computers 106, these computers may be in communication with each other. In some illustrative examples, computer system 104 may be referred to as an aircraft network data processing system.

Number of computers 106 may be located on aircraft 102 and/or in a number of locations remote to aircraft 102. For example, one or more of number of computers 106 may be located at a ground station, a control tower, and/or some other location remote to aircraft 102.

Aircraft 102 also has systems 108 in addition to computer system 104. Systems 108 may include, for example, without limitation, at least one of a hydraulic system, a fuel system, an electrical system, a landing gear system, a control surface system, an environmental system, a sensor system, and other suitable types of systems.

As used herein, the phrase "at least one of", when used with a list of items, means different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C. In other examples, "at least one of" may be, for example, without limitation, two of item A, one of item B, and 10 of item C; four of item B and seven of item C; and other suitable combinations.

In these illustrative examples, computer system 104 may receive information 110 about aircraft 102. At least a portion of information 110 may be received from systems 108. At least a portion of systems 108 may be one, some, or all of systems 108. In some illustrative examples, information 110 also may be received from a location remote to aircraft 102, such as a ground station or a control tower. In other illustrative examples, information 110 may be received from a number of satellites and/or other aircraft.

In these depicted examples, information 110 may include at least one of information about aircraft 102, information about the flight of aircraft 102, information about the operation of the different systems in systems 108 during the flight of aircraft 102, and other suitable types of information. Further, information 110 may take the form of, for example, without limitation, at least one of values, messages, alerts, and/or other suitable types of information for aircraft 102. In these illustrative examples, information 110 is displayed on display system 112 for aircraft 102.

As depicted, display system 112 comprises number of display devices 114. Display system 112 comprises hardware and also may include software. One or more of number of display devices 114 may be located on aircraft 102 and/or in a number of locations remote to aircraft 102.

In these illustrative examples, user interface 116 is generated by computer system 104 for the display of information 110 on display system 112. In particular, user interface 116 may be displayed on one or more of number of display devices 114, and information 110 may be displayed on user interface 116. In this manner, different pieces of information from information 110 may be displayed on different display devices in display system 112.

In particular, information 110 is displayed on plurality of displays 120 in user interface 116. A display in plurality of displays 120 is a presentation of information 110 and does not include hardware in these illustrative examples. One or more displays in plurality of displays 120 may be displayed on a single display device in number of display devices 114.

In these depicted examples, information module 122 manages the display of information 110 on display system 112. Information module 122 is configured to control which portions of information 110 are displayed on the different displays in plurality of displays 120 on display system 112.

Further, information module 122 also may control information 110 displayed on display system 112 based on input received from an operator for aircraft 102. The operator may be a pilot, a co-pilot, a ground station operator, a control tower operator, or some other suitable type of operator for aircraft 102. Input from the operator may be received through number of user input devices 118 associated with computer system 104.

Number of user input devices 118 provides an operator an ability to interact with computer system 104 and, in particular, with information 110 displayed on user interface 116. For example, number of user input devices 118 may allow an operator to switch between different displays in plurality of displays 120 on a display device in number of display devices 114. Further, the operator may use number of user input devices 118 to select a particular system in systems 108 for which information 110 is displayed in user interface 116.

In some cases, an operator may desire to see information from more than one system in systems 108. However, the operator may desire to reduce switching between displays in plurality of displays 120 to see the information from the different systems in systems 108. For example, the operator may desire to see the information on the same display rather than on different displays within plurality of displays 120.

Information module 122 is configured to detect selection 124 of a portion of information 110 made by an operator using one or more of number of user input devices 118. The portion of information 110 selected may be, for example, piece of dynamic information 126 about aircraft 102. As depicted, piece of dynamic information 126 may be selected from first display 128 in plurality of displays 120 on user interface 116.

In these illustrative examples, piece of dynamic information 126 is information that is used to operate aircraft 102 and changes during operation of aircraft 102. In response to selection 124, information module 122 adds piece of dynamic information 126 to custom display 130.

Information module 122 displays custom display 130 in user interface 116 on display system 112 for aircraft 102. In particular, custom display 130 may be displayed on a single display device in number of display devices 114. In some illustrative examples, custom display 130 may display number of pieces of dynamic information 132 selected from number of displays 133 in plurality of displays 120 in addition to piece of dynamic information 126.

In this manner, information 110 from different systems in systems 108 may be displayed on a single display device in number of display devices 114. As a result, the need for switching between different displays in plurality of displays 120 may be reduced. Further, readability of piece of dynamic information 126 and number of pieces of dynamic information 132 on the same display device may not be reduced. With the selection of pieces of dynamic information 126, an operator may focus more on the information that is desired as opposed to having too much information displayed on a display device.

Additionally, information module 122 also identifies set of functions 134 for piece of dynamic information 126 and/or number of pieces of dynamic information 132 on custom display 130. As used herein, "a set" used with reference to items, means zero, one, or more items. For example, "set of functions 134" may be zero, one, two, or more functions. In some cases, set of functions 134 may be an empty set. In other words, no functions may be identified for piece of dynamic information 126.

In these illustrative examples, set of functions 134 may include functions that allow piece of dynamic information 126 and/or number of pieces of dynamic information 132 to be used, stored, printed, deleted, and/or controlled in some other suitable manner. In some cases, one or more of set of functions 134 may be for custom display 130. Set of functions 134 is added to custom display 130 in these depicted examples. Further, custom display 130 may be stored for use at a subsequent time.

In this manner, custom display 130 may include pieces of dynamic information 126 from different displays in plurality of displays 120 associated with different systems in systems 108 for aircraft 102.

The illustration of display environment 100 in FIG. 1 is not meant to imply physical or architectural limitations to the manner in which an advantageous embodiment may be implemented. Other components in addition to and/or in place of the ones illustrated may be used. Some components may be unnecessary. Also, the blocks are presented to illustrate some functional components. One or more of these blocks may be combined and/or divided into different blocks when implemented in an advantageous embodiment.

For example, in some illustrative examples, custom display 130 may be displayed on more than a single display device. In other illustrative examples, additional display systems may be present for aircraft 102 in addition to display system 112. In some cases, selection 124 may be made by an operator located at a ground station or some other location remote to aircraft 102.

Figure 2:
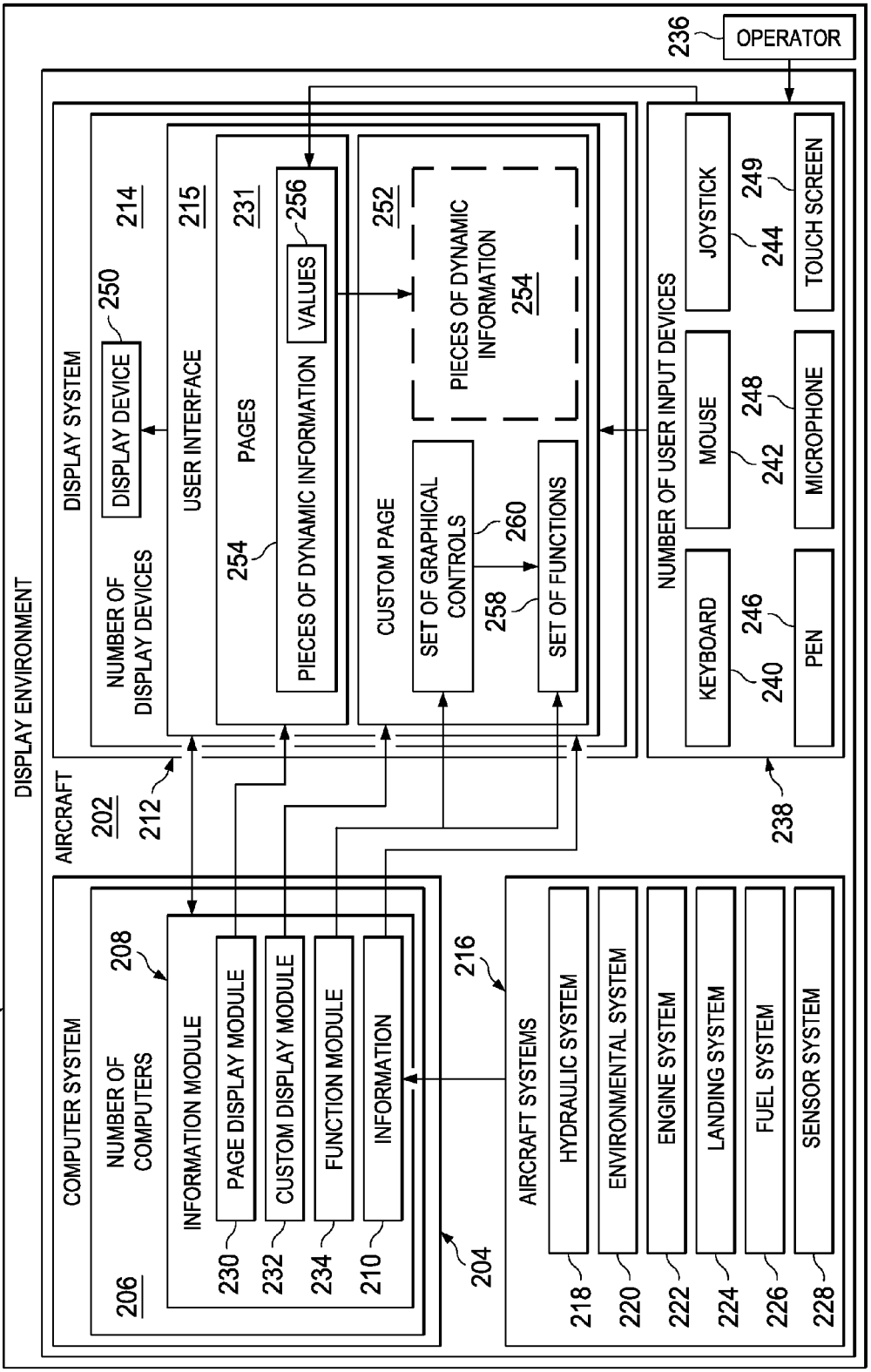
FIG. 2 is an illustration of a display environment in the form of a block diagram in accordance with an advantageous embodiment.

With reference now to FIG. 2, an illustration of a display environment in the form of a block diagram is depicted in accordance with an advantageous embodiment. In this illustrative example, display environment 200 is an example of one implementation for display environment 100 in FIG. 1.

As depicted, display environment 200 includes aircraft 202 and computer system 204 on aircraft 202. Computer system 204 comprises number of computers 206 in this illustrative example. Information module 208 is implemented in computer system 204. Information module 208 is an example of one implementation for information module 122 in FIG. 1.

Information module 208 is configured to manage the display of information 210 on display system 212 on aircraft 202. Display system 212 comprises number of display devices 214 in this illustrative example. In particular, information module 208 manages the display of information 210 on user interface 215 on number of display devices 214.

Information 210 displayed on display system 212 may be received from aircraft systems 216. Aircraft systems 216, in this illustrative example, include hydraulic system 218, environmental system 220, engine system 222, landing system 224, fuel system 226, and sensor system 228. Sensor system 228 may include, for example, at least one of a temperature sensor, an inertial measurement unit, a global positioning system unit, a motion sensor, a camera system, a radar system, and other suitable types of sensors. Of course, in other illustrative examples, aircraft systems 216 may include other systems in addition to and/or in place of these systems.

In this illustrative example, information module 208 comprises page display module 230, custom display module 232, and function module 234. Page display module 230 is configured to generate pages 231 for aircraft systems 216. Pages 231 are examples of one implementation for plurality of displays 120 in FIG. 1. Each page in pages 231 is a presentation of a portion of information 210. Page display module 230 is configured to display pages 231 on user interface 215 on number of display devices 214.

In one illustrative example, a page in pages 231 may include a presentation of the portion of information 210 received from a particular system in aircraft systems 216. In another illustrative example, one page in pages 231 may be used to present the portion of information 210 received from two or more of aircraft systems 216. As yet another example, more than one page in pages 231 may be used to display the portion of information 210 received from one of aircraft systems 216.

Operator 236 for aircraft 202 may interact with user interface 215 using number of user input devices 238. Number of user input devices 238 may include, for example, at least one of keyboard 240, mouse 242, joystick 244, pen 246, microphone 248, touch screen 249, and other suitable types of user input devices.

In these illustrative examples, display device 250 in number of display devices 214 is configured to receive user input entered through number of user input devices 238. For example, touch screen 249 may be implemented in display device 250 and configured to receive user input entered using pen 246. Of course, in some illustrative examples, touch screen 249 may be configured to receive user input entered by operator 236 touching display device 250.

Custom display module 232 is configured to generate custom page 252 for display on user interface 215. Custom page 252 may be displayed on, for example, display device 250. Custom page 252 may be generated using pieces of dynamic information 254 about aircraft 202 selected from one or more of pages 231. Pieces of dynamic information 254 may be selected from pages 231 by operator 236 using number of user input devices 238.

Pieces of dynamic information 254 are portions of information 210 that are used to operate aircraft 202 and that change over time during the operation of aircraft 202. For example, a piece of dynamic information in pieces of dynamic information 254 about aircraft 202 may include, for example, without limitation, an engine temperature, a fuel use, an altitude, a position of a control surface, a cabin temperature, hydraulic pressure, a fuel level, a velocity for aircraft 202, and/or other suitable types of information that may be generated by aircraft systems 216.

Selection of pieces of dynamic information 254 may include the selection of values 256 within pieces of dynamic information 254. Further, when pieces of dynamic information 254 are selected, other types of information may be included in pieces of dynamic information 254.

For example, a selection of a piece of dynamic information may include information, such as, for example, labels, text, images, and/or other suitable information associated with the piece of dynamic information. As one illustrative example, a selection of a value on one of pages 231 may cause a number of values associated with the selected value, a number of labels, and/or other suitable information in addition to the selected value to be selected as a piece of dynamic information.

Custom display module 232 adds pieces of dynamic information 254 to custom page 252. Further, custom display module 232 may display values 256 for pieces of dynamic information 254 in custom page 252. Values 256 displayed for pieces of dynamic information 254 may be current values for pieces of dynamic information 254, or values that were stored for pieces of dynamic information 254 at a previous point in time.

In these illustrative examples, values 256 may be updated on custom page 252 continuously and/or periodically for pieces of dynamic information 254. For example, values 256 may be updated on custom page 252 in substantially real-time. Further, operator 236 may select how often values 256 for pieces of dynamic information 254 are to be updated on custom page 252 using set of functions 258 in custom page 252.

Set of functions 258 are identified and added to custom page 252 by function module 234 in this illustrative example. As one illustrative example, a function in set of functions 258 may be identified for one or more pieces of information in pieces of dynamic information 254. In another illustrative example, a function in set of functions 258 may be identified for custom page 252 itself.

In these illustrative examples, function module 234 may add set of functions 258 to custom page 252 by adding set of graphical controls 260 to custom page 252. Set of graphical controls 260 may be, for example, buttons and/or other suitable types of graphical controls that allow operator 236 to use set of functions 258.

For example, operator 236 may select a graphical control in set of graphical controls 260 using number of user input devices 238. The selection of this graphical control, in turn, selects a corresponding function in set of functions 258. The selection of this function causes function module 234 to perform the selected function.

In this manner, information module 208 is configured to allow operator 236 to view desired information from information 210 on a single display device. Further, operator 236 may view the information displayed on custom page 252 without having to switch between different displays. As a result, the time needed by operator 236 to find and view desired information may be reduced as compared to when information 210 is displayed on multiple display devices and/or multiple displays.

Figure 3:
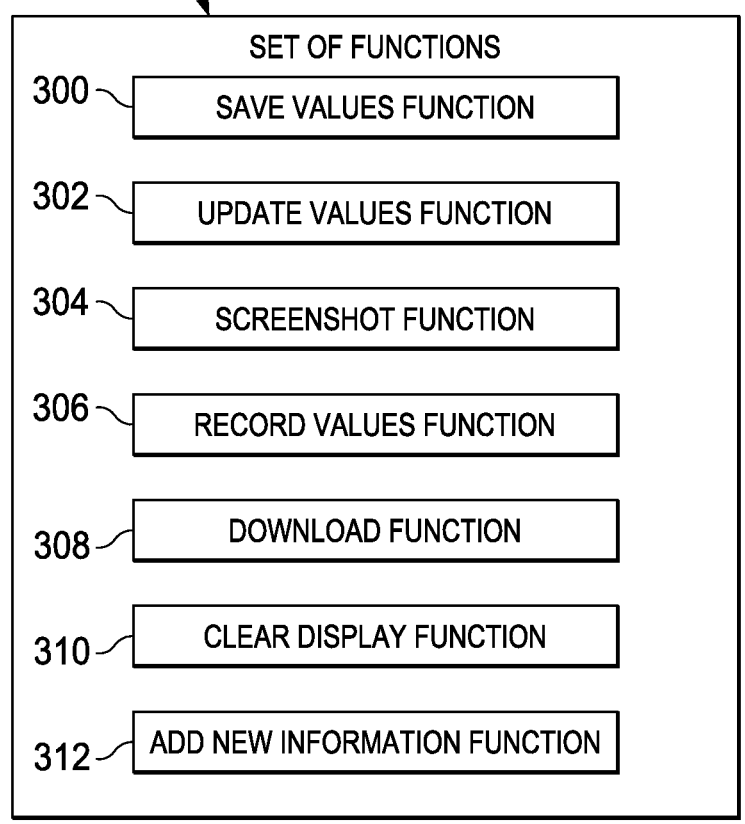
FIG. 3 is an illustration of a set of functions in the form of a block diagram in accordance with an advantageous embodiment.

With reference now to FIG. 3, an illustration of set of functions 258 from FIG. 2 in the form of a block diagram is depicted in accordance with an advantageous embodiment. In this illustrative example, set of functions 258 from FIG. 2 is depicted in more detail. The different functions described in set of functions 258 in FIG. 3 are example functions that may be implemented in set of functions 134 in FIG. 1.

As depicted, set of functions 258 may include at least one of save values function 300, update values function 302, screenshot function 304, record values function 306, download function 308, clear display function 310, and add new information function 312. Of course, in other illustrative examples, other functions may be present in addition to and/or in place of these functions.

Save values function 300 is a function that allows values 256 for pieces of dynamic information 254 on custom page 252 in FIG. 2 to be saved. In other words, a selection of save values function 300 may cause values 256 currently displayed in custom page 252 to be saved. Values 256 may be saved for future use at any time during the operation of aircraft 202 in FIG. 2. Values 256 also may be saved for downloading or viewing at other times, such as after the flight of aircraft 202.

In particular, these values may be stored in, for example, a storage system associated with computer system 204 in FIG. 2. The storage system may comprise, for example, a database, memory, persistent storage, a server, and/or other types of storage devices.

In some illustrative examples, save values function 300 may be added to custom page 252 for a particular piece of dynamic information in pieces of dynamic information 254. In other illustrative examples, more than one of save values function 300 may be added to custom page 252 for pieces of dynamic information 254.

Update values function 302 is a function that updates values 256 for pieces of dynamic information 254. For example, when values 256 that are currently displayed on custom page 252 are not the most up-to-date values for pieces of dynamic information 254, update values function 302 may be selected to obtain current values for pieces of dynamic information 254.

Screenshot function 304 is a function that generates a screenshot of custom page 252 and stores the screenshot. A screenshot is an image of custom page 252. Any number of screenshots of custom page 252 may be generated when any number of predefined events occur during the operation of aircraft 202. These events may be pre-defined by, for example, the operator of aircraft 202.

In this illustrative example, record values function 306 is a function that records values 256 for pieces of dynamic information 254 over time. For example, when record values function 306 is selected, values 256 for pieces of dynamic information 254 may be recorded from the time at which record values function 306 is selected. In this manner, changes to values 256 for pieces of dynamic information 254 may be recorded over time. This information may be used in, for example, performing maintenance for aircraft 202 at a future point in time. Further, this information may be used to perform diagnostics for aircraft 202.

Download function 308 is a function that downloads a screenshot of custom page 252 and/or values 256 in custom page 252 to a location remote to aircraft 202. This location may be, for example, a ground station when download function 308 is selected.

Clear display function 310 is a function that clears all information displayed on custom page 252 when selected. In other words, when clear display function 310 is selected, all of pieces of dynamic information 254 may be removed from display on custom page 252.

In this illustrative example, add new information function 312 is a function that allows additional pieces of dynamic information 254 to be added to custom page 252. For example, a selection of add new information function 312 may allow operator 236 to switch to different pages in pages 231 to select additional pieces of dynamic information 254 for display on custom page 252.

The illustrations of display environment 200 in FIG. 2 and set of functions 258 in FIG. 3 are not meant to imply physical or architectural limitations to the manner in which an advantageous embodiment may be implemented. Other components in addition to and/or in place of the ones illustrated may be used. Some components may be unnecessary. Also, the blocks are presented to illustrate some functional components. One or more of these blocks may be combined and/or divided into different blocks when implemented in an advantageous embodiment.

For example, in some illustrative examples, a control surface system also may be present in aircraft systems 216. In other illustrative examples, a modified custom display function also may be present in set of functions 258 in FIG. 3.

With reference now to FIGS. 4-8, illustrations of displays on a user interface are depicted in accordance with an advantageous embodiment. In these illustrative examples, different displays are displayed on user interface 400. User interface 400 is an example of one implementation for user interface 116 in FIG. 1 and/or user interface 215 in FIG. 2. User interface 400 may be displayed on a display system for an aircraft, such as display system 112 for aircraft 102 in FIG. 1 and/or display system 212 for aircraft 202 in FIG. 2.

Figure 4:
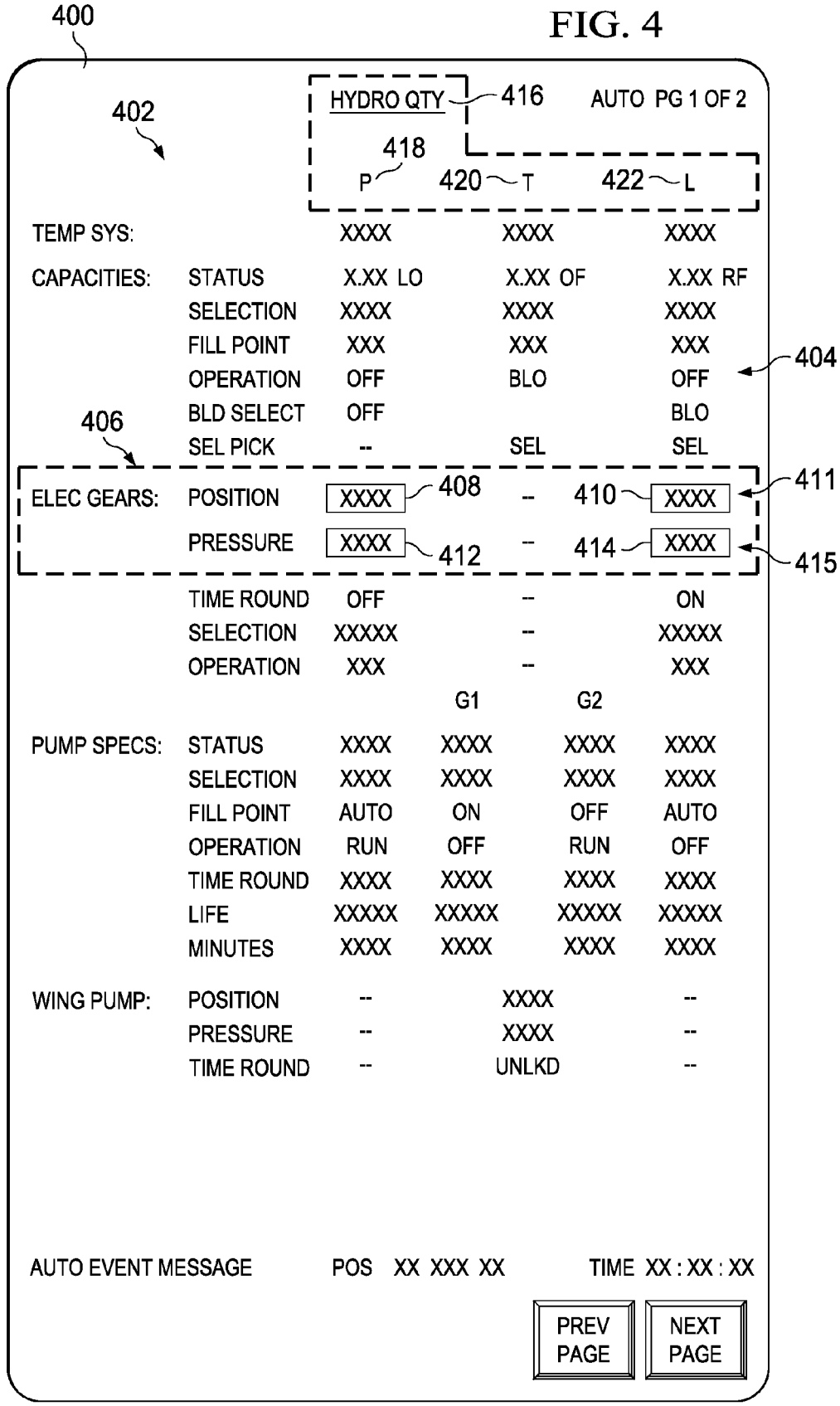
FIG. 4 is an illustration of a first page displayed on a user interface in accordance with an advantageous embodiment.

Turning now to FIG. 4, first page 402 is displayed on user interface 400. First page 402 is a presentation of information 404 for a hydraulic system. In particular, first page 402 may be generated using page display module 230 in FIG. 2. As depicted in this example, piece of dynamic information 406 has been selected from first page 402 for display in a custom display.

In this illustrative example, the selection of piece of dynamic information 406 may be made by an operator selecting one or more of values 408, 410, 412, and 414. As one illustrative example, a selection of value 408 in row 411 on first page 402 may cause all information in row 411, including value 408 and value 410, to be selected. For example, the selection of value 408 causes the text and labels in row 411 to be selected. Further, a selection of value 412 in row 415 on first page 402 may cause all information in row 415, including value 412 and value 414, to be selected.

Additionally, the selection of information in row 411 and row 415 causes labels 416, 418, 420, and 422 to be selected as part of piece of dynamic information 406. In this manner, values 408, 410, 412, 414, and all additional information in piece of dynamic information 406 will be included in the custom display.

Figure 5:
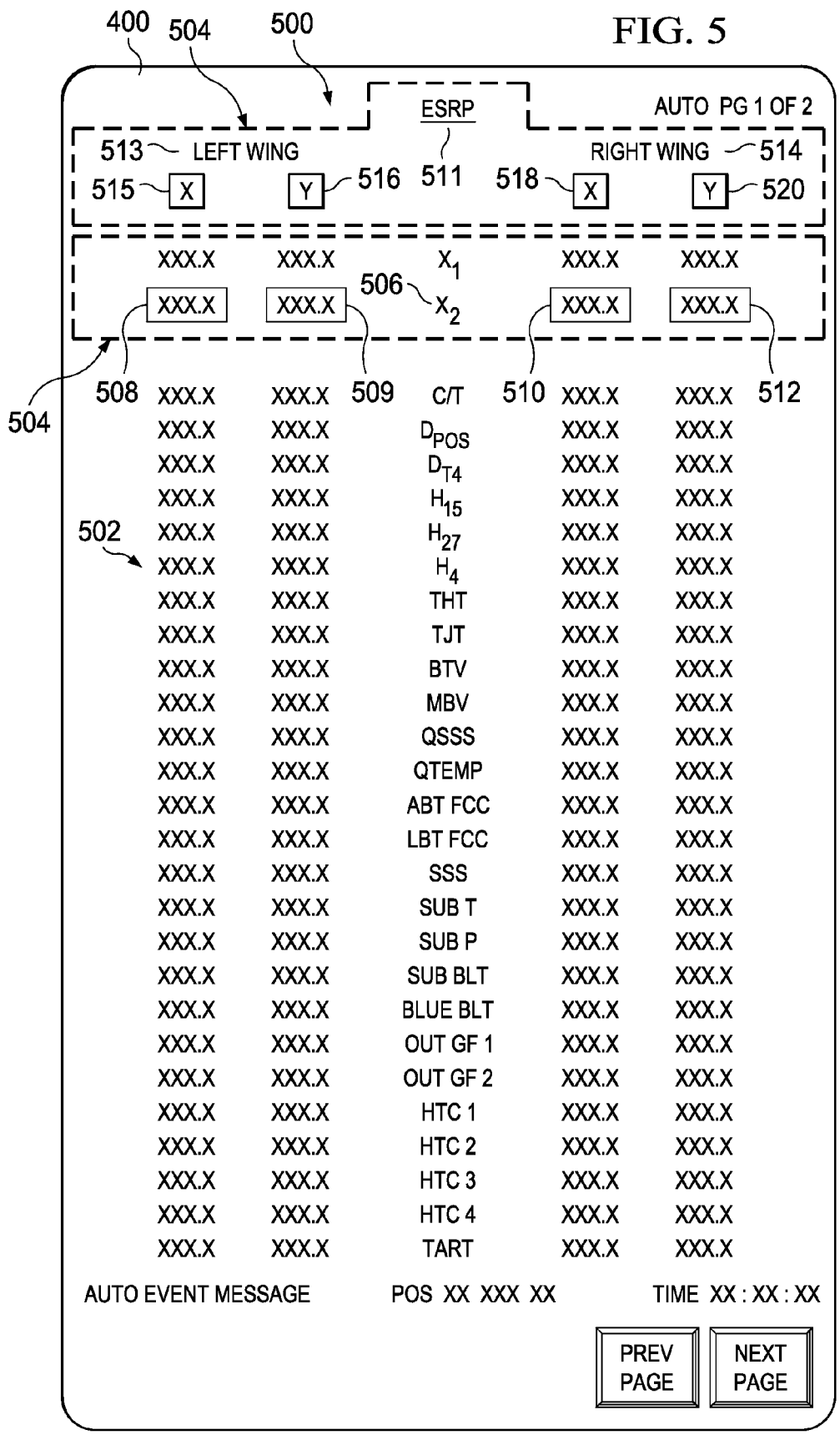
FIG. 5 is an illustration of a second page displayed on a user interface in accordance with an advantageous embodiment.

In FIG. 5, second page 500 is displayed on user interface 400. Second page 500 is a presentation of information 502 for an electronic propulsion control system (EPCS). In particular, second page 500 may be generated using page display module 230 in FIG. 2. As depicted, piece of dynamic information 504 has been selected from second page 500 for display in the custom display. In this illustrative example, a selection of label 506 causes values 508, 509, 510, and 512, as well as labels 511, 513, 514, 515, 516, 518, and 520 to be selected in piece of dynamic information 504.

Figure 6:
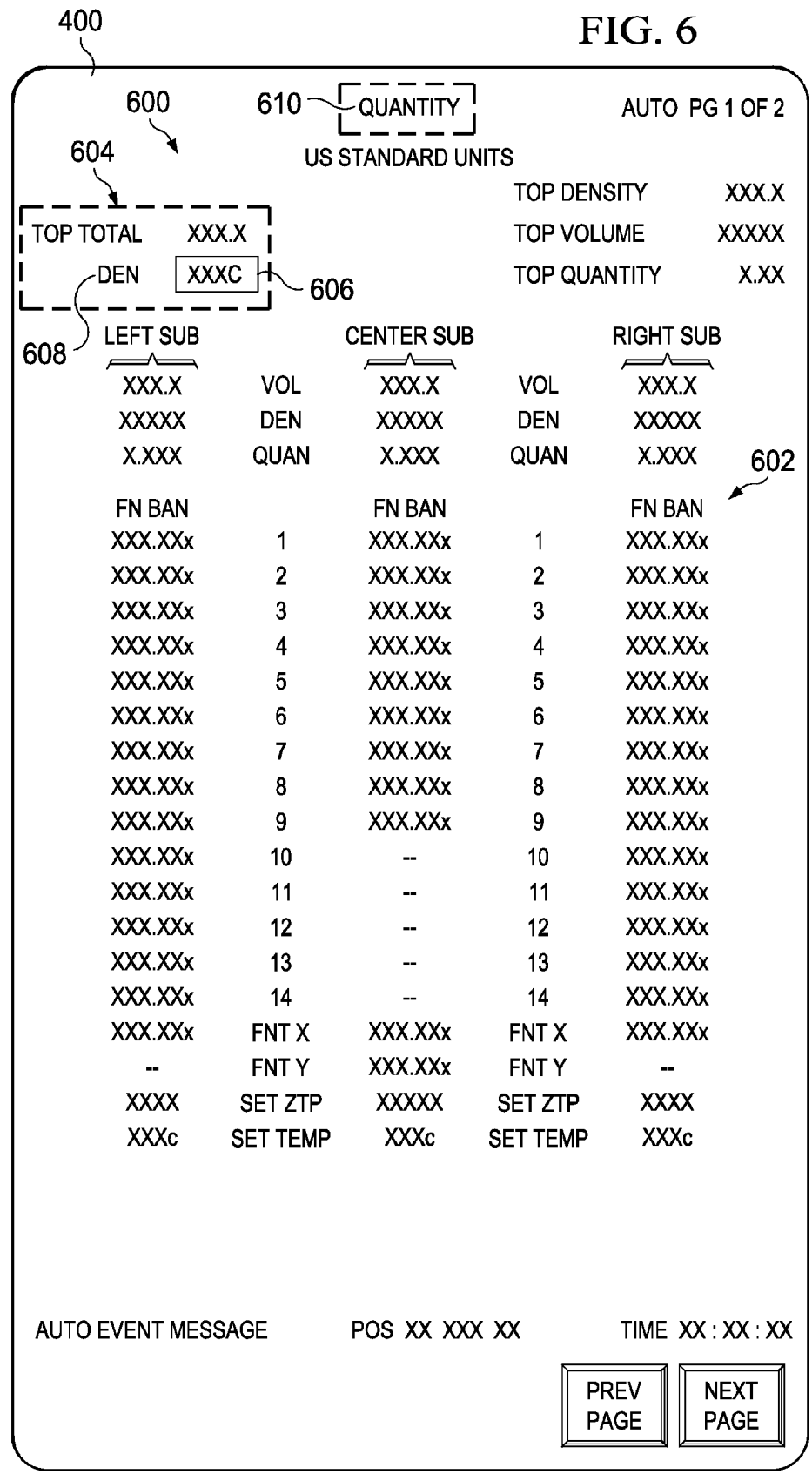
FIG. 6 is an illustration of a third page displayed on a user interface in accordance with an advantageous embodiment.

Turning now to FIG. 6, third page 600 is displayed on user interface 400. Third page 600 is a presentation of information 602 for a fuel system. In particular, third page 600 may be generated using page display module 230 in FIG. 2. As depicted, piece of dynamic information 604 has been selected from third page 600 for display in the custom display. In particular, value 606 has been selected from third page 600. This selection causes label 608 and label 610 to also be selected in piece of dynamic information 604.

Figure 7:
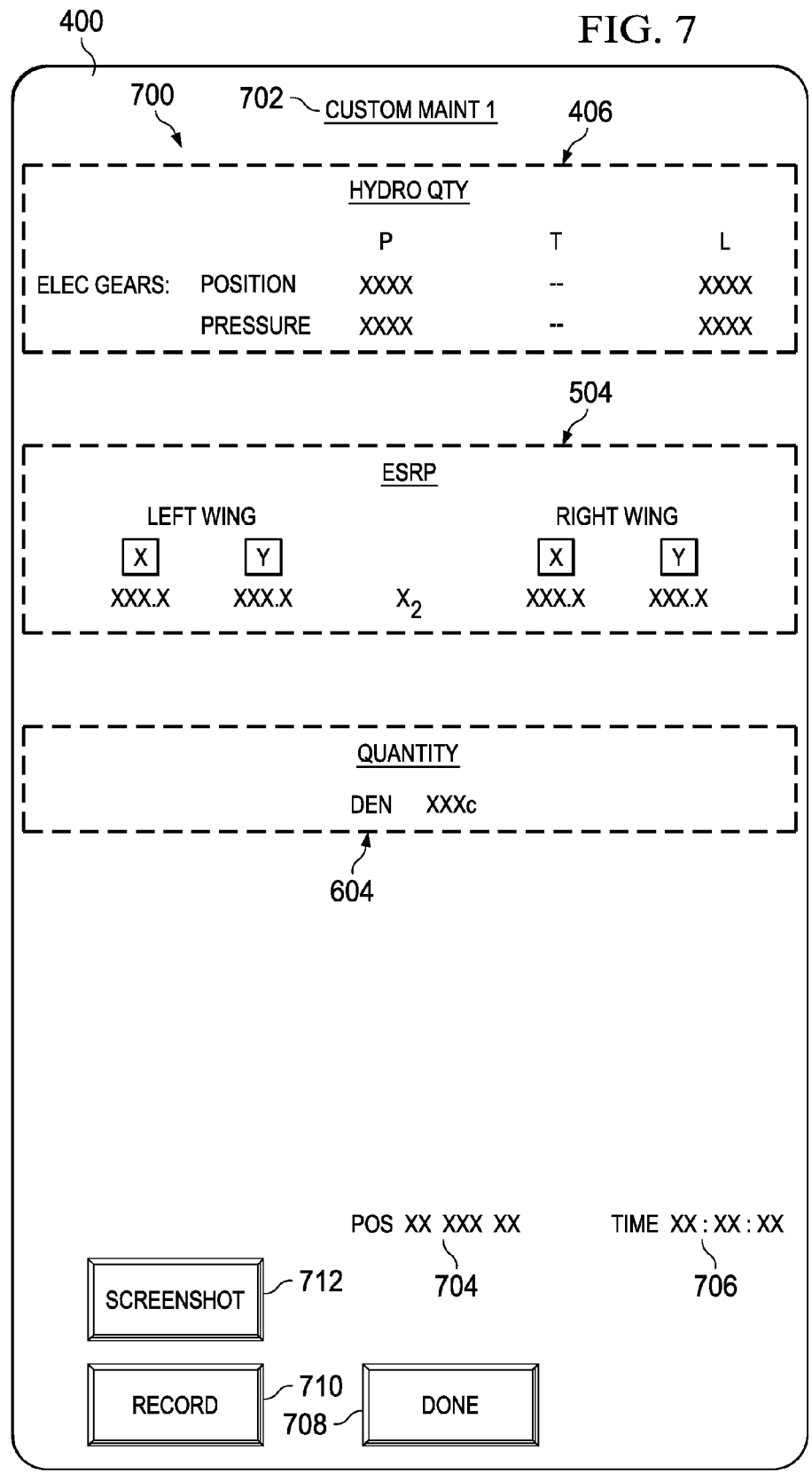
FIG. 7 is an illustration of a custom page displayed on a user interface in accordance with an advantageous embodiment.

With reference now to FIG. 7, custom page 700 is displayed on user interface 400. Custom page 700 may be generated using custom display module 232 in FIG. 2. Custom page 700 displays piece of dynamic information 406 selected from first page 402 in FIG. 4, piece of dynamic information 504 selected from second page 500 in FIG. 5, and piece of dynamic information 604 selected from third page 600 in FIG. 6. Further, title 702, date 704, and time 706 are also displayed on custom page 700.

As depicted, graphical control 708, graphical control 710, and graphical control 712 are displayed on custom page 700. An operator may select graphical control 710 to begin recording the different values in the different pieces of information displayed on custom page 700.

A selection of graphical control 710 causes these values to be recorded over time until the operator selects graphical control 708. In other words, a selection of graphical control 708 causes the recording of the values to stop. Further, the operator may select graphical control 712 to generate a screenshot of custom page 700. This screenshot may be stored for future use.

Figure 8:
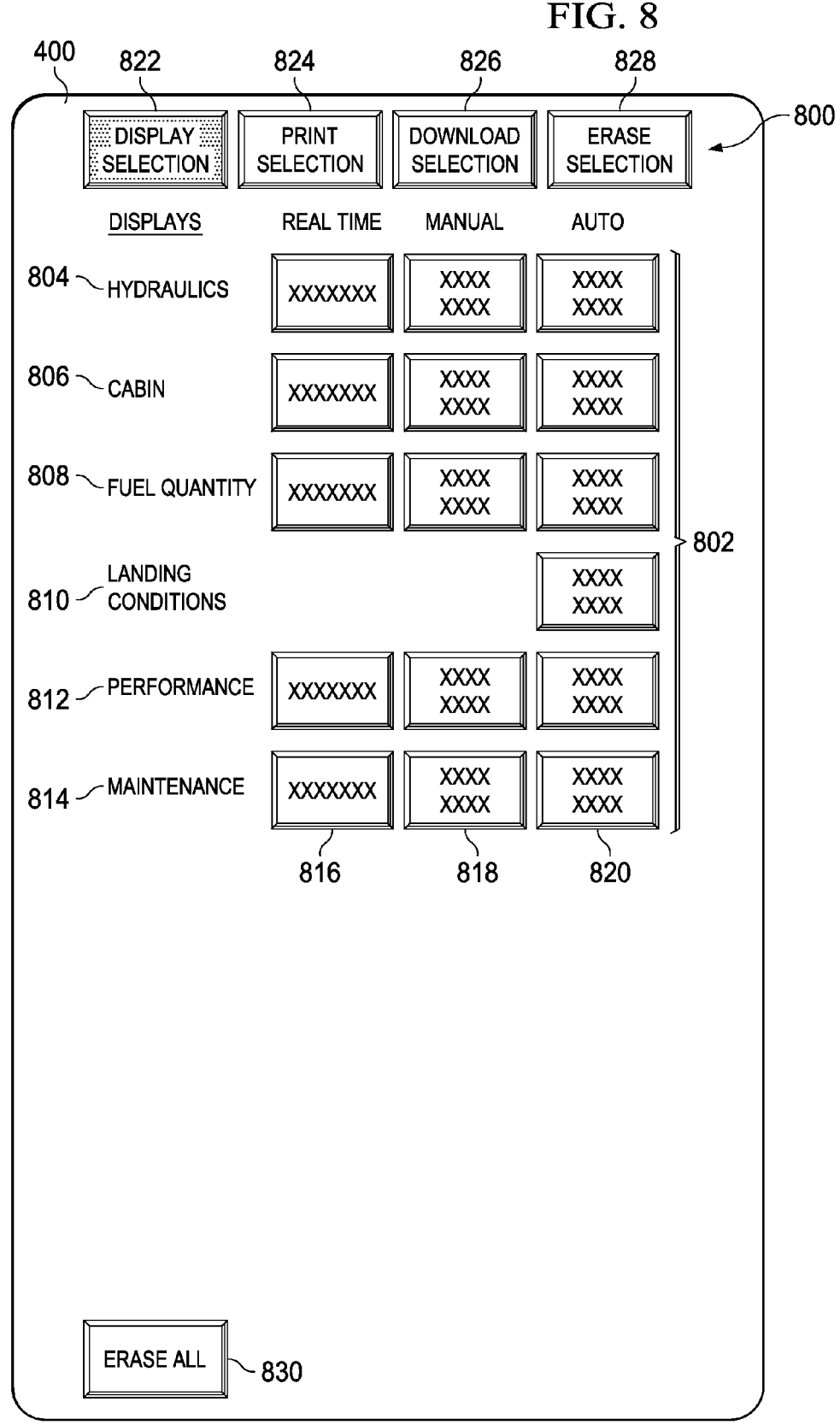
FIG. 8 is an illustration of a display maintenance page displayed on a user interface in accordance with an advantageous embodiment.

With reference now to FIG. 8, display maintenance page 800 is displayed on user interface 400. In this illustrative example, display maintenance page 800 may be used by an operator to select the information to be displayed in user interface 400. As depicted, display maintenance page 800 displays list of pages 802. List of pages 802 identifies different pages on which information may be presented.

For example, list of pages 802 includes labels 804, 806, 808, 810, 812, and 814. Label 804 identifies first page 402 from FIG. 4. Label 806 identifies second page 500 from FIG. 5. Label 808 identifies third page 600 from FIG. 6. Label 810 and label 812 identify other pages that provide landing condition information and performance information, respectively. Further, label 814 identifies custom page 700 from FIG. 7.

In this illustrative example, a real-time display, a manual screenshot that was previously generated in response to user input, and/or an automated screenshot that was previously generated in response to a number of events without requiring user input, may be selected for each of the pages listed in list of pages 802.

As one illustrative example, a selection of real-time display 816 associated with label 814 selects a real-time display for custom page 700 from FIG. 7. A real-time display for custom page 700 displays substantially real-time values for the different pieces of dynamic information displayed on custom page 700.

Further, a selection of manual screenshot 818 associated with label 814 selects a screenshot that was previously generated in response to user input from an operator and that has been stored. For example, a selection of manual screenshot 818 may select a screenshot previously generated and stored in response to an operator selecting graphical control 712 in FIG. 7. Selecting manual screenshot 818 selects the most recent screenshot generated in response to user input from the operator.

Additionally, a selection of automated screenshot 820 associated with label 814 selects a screenshot that was previously generated in response to a number of events without requiring user input from the operator. For example, the screenshot may have been generated and stored in response to a selected phase of flight for the aircraft, a selected reduction in velocity, and/or some other suitable type of event. Further, this screenshot may have been generated using, for example, function module 234 in FIG. 2. A selection of automated screenshot 820 selects the most recent screenshot generated in response to the number of events.

When any one of the real-time displays, manual screenshots, and/or automated screenshots are selected, a function may be performed when the operator selects one of display button 822, print button 824, download button 826, or erase button 828. As one illustrative example, when real-time display 816 is selected, a selection of display button 822 causes a real-time display of custom page 700 to be displayed in user interface 400.

As another illustrative example, when manual screenshot 818 is selected, a selection of print button 824 causes the most recent screenshot of custom page 700 from FIG. 7 generated in response to user input to be printed. Further, when manual screenshot 818 is selected, a selection of download button 826 causes the most recent screenshot of custom page 700 from FIG. 7 generated in response to user input to be downloaded to, for example, a ground station.

As yet another illustrative example, when automated screenshot 820 is selected, a selection of erase button 828 causes automated screenshot 820 to be removed from storage and from display maintenance page 800. Further, in this illustrative example, a selection of erase all button 830 causes all manual screenshots and/or automated screenshots for the pages listed in list of pages 802 to be removed from storage and from display maintenance page 800.

Figure 9:
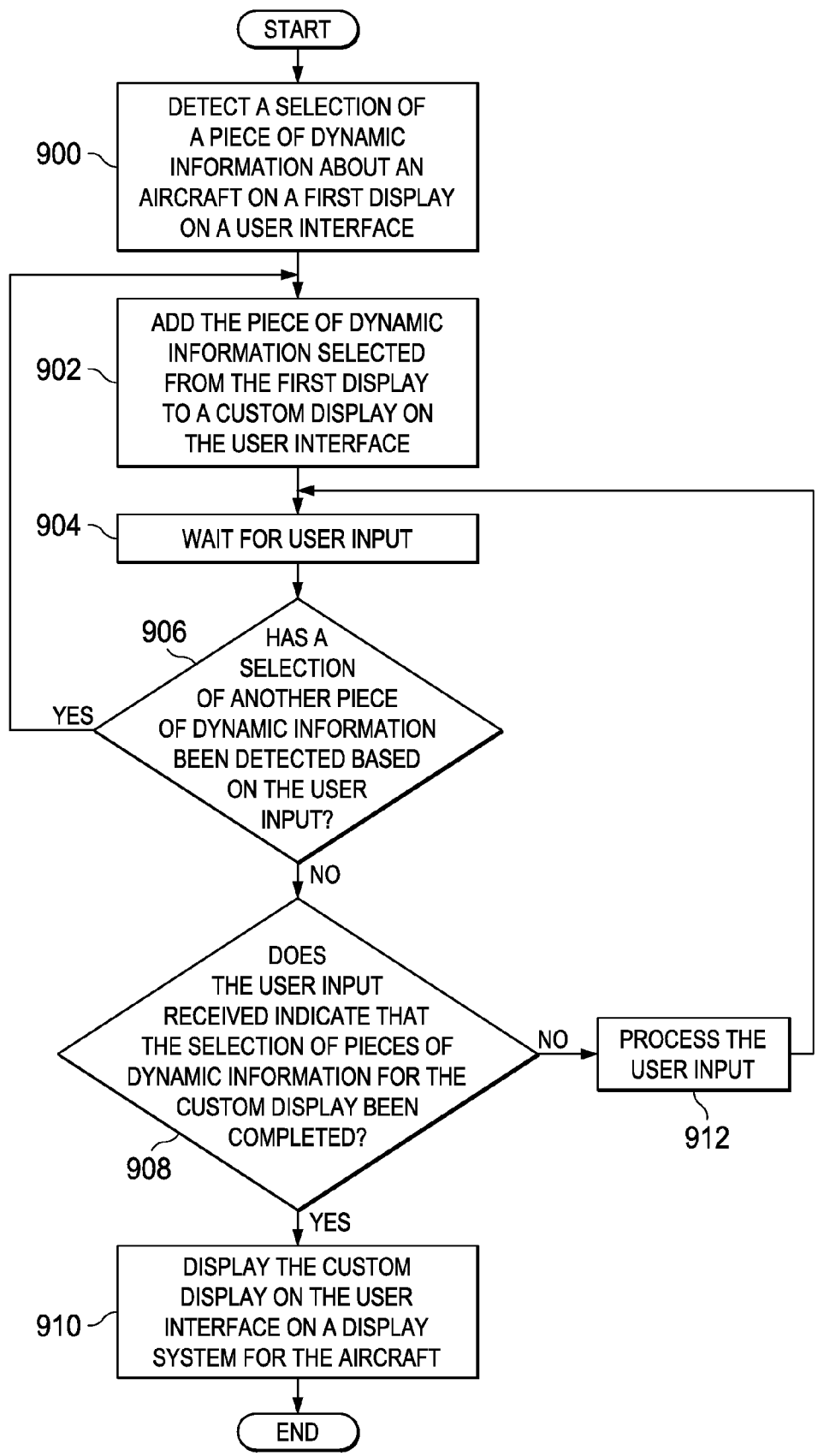
FIG. 9 is an illustration of a flowchart of a process for displaying aircraft information in accordance with an advantageous embodiment.

With reference now to FIG. 9, an illustration of a flowchart of a process for displaying aircraft information is depicted in accordance with an advantageous embodiment. The process illustrated in FIG. 9 may be implemented using information module 122 and user interface 116 in FIG. 1.

The process begins by detecting a selection of a piece of dynamic information about an aircraft on a first display on a user interface (operation 900). The selection may be made using, for example, number of user input devices 118 in FIG. 1. The piece of dynamic information includes information that is used to operate the aircraft and changes during operation of the aircraft. In some illustrative examples, the piece of dynamic information also may include information that does not change during operation of the aircraft.

The process then adds the piece of dynamic information selected from the first display to a custom display on the user interface (operation 902). Thereafter, the process waits for user input (operation 904). The process then determines whether a selection of another piece of dynamic information has been detected based on the user input (operation 906). If a selection of another piece of dynamic information has been detected, the process returns to operation 902 as described above.

Otherwise, the process determines whether the user input received indicates that the selection of pieces of dynamic information for the custom display has been completed (operation 908). For example, the user input may be a selection of a graphical control indicating that modifications to the custom display have been completed.

If the user input indicates that the selection of pieces of dynamic information for the custom display has been completed, the process displays the custom display on the user interface on a display system for the aircraft (operation 910), with the process terminating thereafter. Operation 910 may be performed during operation of the aircraft.

In operation 910, if the user input does not indicate that the selection of pieces of dynamic information for the custom display has been completed, the process processes the user input (operation 912), with the process then returning to operation 904 as described above.

Figure 10:
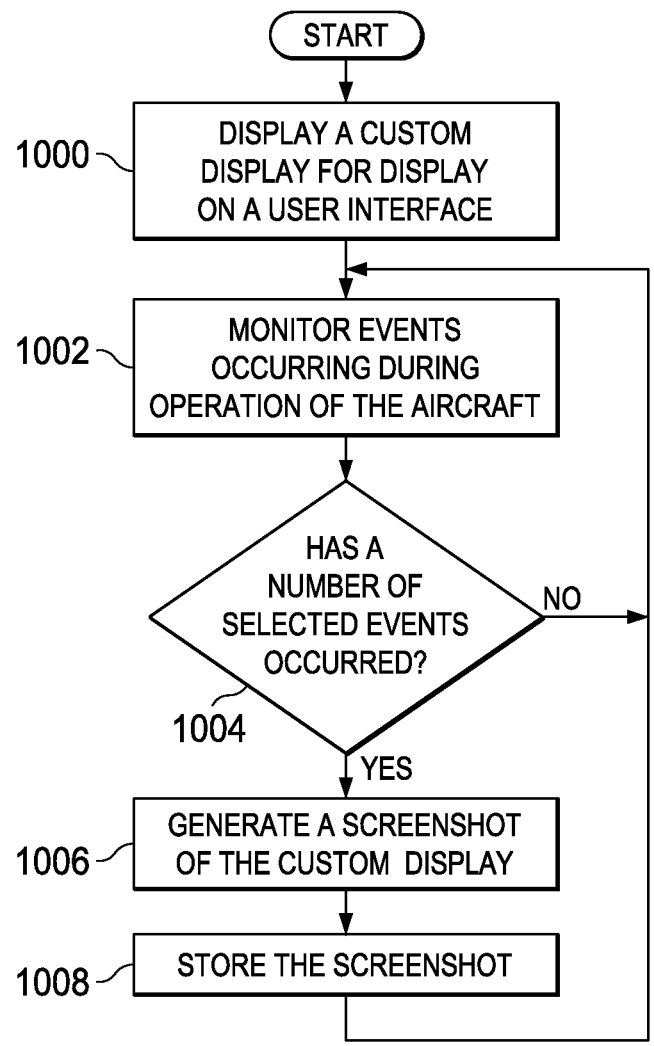
FIG. 10 is an illustration of a flowchart of a process for displaying aircraft information in accordance with an advantageous embodiment.

With reference now to FIG. 10, an illustration of a flowchart of a process for displaying aircraft information is depicted in accordance with an advantageous embodiment. The process illustrated in FIG. 10 may be implemented using information module 122 and user interface 116 in FIG. 1. This process may be performed during operation of an aircraft, such as aircraft 102 in FIG. 1.

The process begins by displaying a custom display for display on a user interface (operation 1000). This custom display may be generated and displayed using the process described in FIG. 9. The process monitors events occurring during operation of the aircraft (operation 1002).

Next, the process determines whether a number of selected events have occurred (operation 1004). The number of selected events may include, for example, at least one of a selected speed for the aircraft, the beginning of a selected phase of flight for the aircraft, an alert being generated, a notification being received from a ground station, landing gear being deployed, and other suitable types of events.

If the number of selected events has not occurred, the process returns to operation 1002 as described above. Otherwise, the process generates a screenshot of the custom display (operation 1006). Thereafter, the process stores the screenshot for future use (operation 1008), with the process then returning to operation 1002 as described above. The screenshot may be used in performing maintenance operations for the aircraft after the flight of the aircraft, determining whether the performance of the aircraft during the flight of the aircraft meets a desired level of performance, and/or performing other suitable operations.

The flowcharts and block diagrams in the different depicted embodiments illustrate the architecture, functionality, and operation of some possible implementations of apparatuses and methods in an advantageous embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an advantageous embodiment, the function or functions noted in the block may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 11:
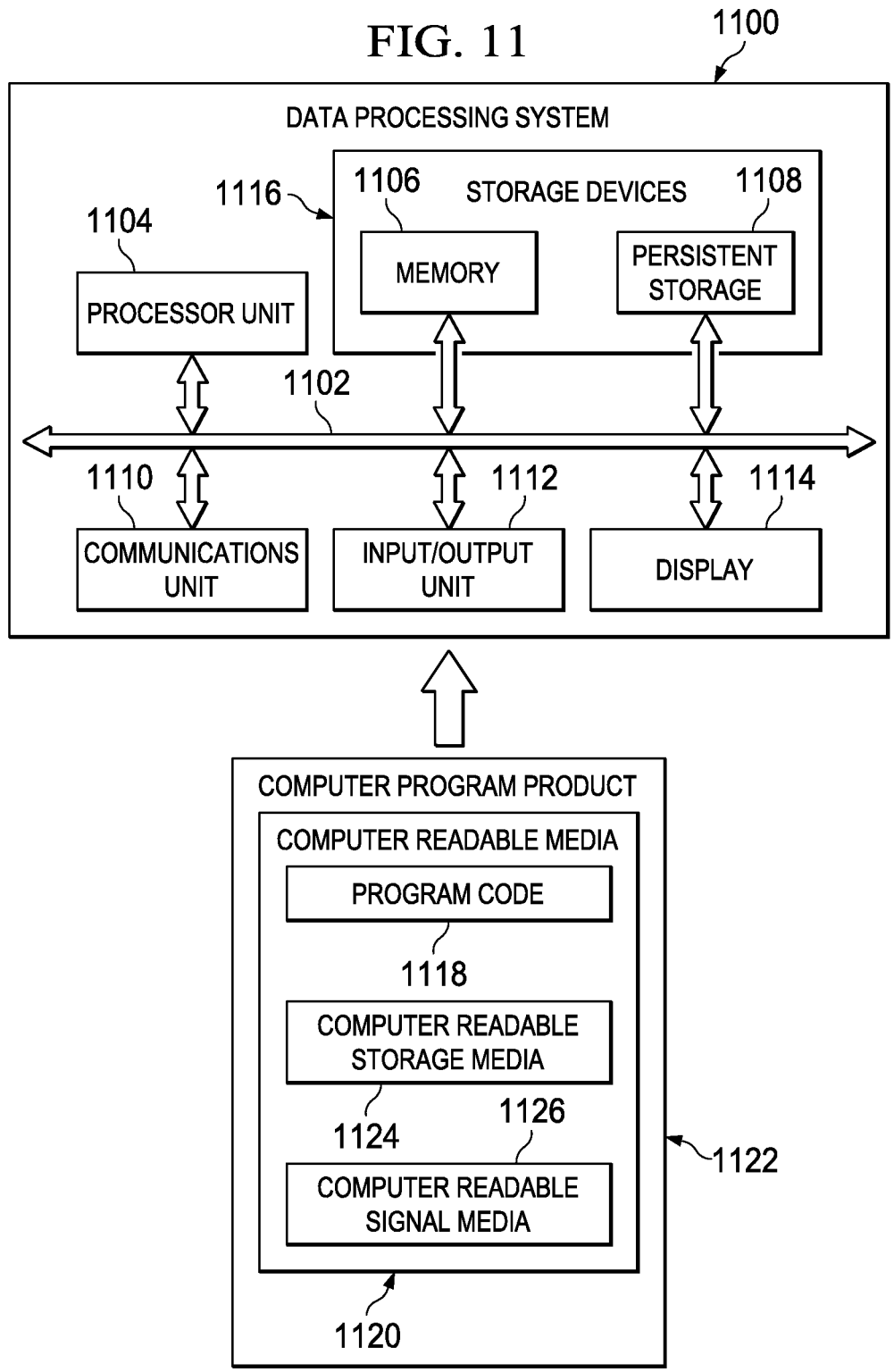
FIG. 11 is an illustration of a data processing system in accordance with an advantageous embodiment.

Turning now to FIG. 11, an illustration of a data processing system is depicted in accordance with an advantageous embodiment. In this illustrative example, data processing system 1100 may be used to implement one or more of number of computers 106 in FIG. 1 and/or one or more of number of computers 206 in FIG. 2. As depicted, data processing system 1100 includes communications framework 1102, which provides communications between processor unit 1104, memory 1106, persistent storage 1108, communications unit 1110, input/output (I/O) unit 1112, and display 1114.

Processor unit 1104 serves to execute instructions for software that may be loaded into memory 1106. Processor unit 1104 may be a number of processors, a multi-processor core, or some other type of processor, depending on the particular implementation. A number, as used herein with reference to an item, means one or more items. Further, processor unit 1104 may be implemented using a number of heterogeneous processor systems in which a main processor is present with secondary processors on a single chip. As another illustrative example, processor unit 1104 may be a symmetric multi-processor system containing multiple processors of the same type.

Memory 1106 and persistent storage 1108 are examples of storage devices 1116. A storage device is any piece of hardware that is capable of storing information, such as, for example, without limitation, data, program code in functional form, and/or other suitable information either on a temporary basis and/or a permanent basis. Storage devices 1116 may also be referred to as computer readable storage devices in these examples. Memory 1106, in these examples, may be, for example, a random access memory or any other suitable volatile or non-volatile storage device. Persistent storage 1108 may take various forms, depending on the particular implementation.

For example, persistent storage 1108 may contain one or more components or devices. For example, persistent storage 1108 may be a hard drive, a flash memory, a rewritable optical disk, a rewritable magnetic tape, or some combination of the above. The media used by persistent storage 1108 also may be removable. For example, a removable hard drive may be used for persistent storage 1108.

Communications unit 1110, in these examples, provides for communications with other data processing systems or devices. In these examples, communications unit 1110 is a network interface card. Communications unit 1110 may provide communications through the use of either or both physical and wireless communications links.

Input/output unit 1112 allows for input and output of data with other devices that may be connected to data processing system 1100. For example, input/output unit 1112 may provide a connection for user input through a keyboard, a mouse, and/or some other suitable input device. Further, input/output unit 1112 may send output to a printer. Display 1114 provides a mechanism to display information to a user.

Instructions for the operating system, applications, and/or programs may be located in storage devices 1116, which are in communication with processor unit 1104 through communications framework 1102. In these illustrative examples, the instructions are in a functional form on persistent storage 1108. These instructions may be loaded into memory 1106 for execution by processor unit 1104. The processes of the different embodiments may be performed by processor unit 1104 using computer-implemented instructions, which may be located in a memory, such as memory 1106.

These instructions are referred to as program code, computer usable program code, or computer readable program code that may be read and executed by a processor in processor unit 1104. The program code in the different embodiments may be embodied on different physical or computer readable storage media, such as memory 1106 or persistent storage 1108.

Program code 1118 is located in a functional form on computer readable media 1120 that is selectively removable and may be loaded onto or transferred to data processing system 1100 for execution by processor unit 1104. Program code 1118 and computer readable media 1120 form computer program product 1122 in these examples. In one example, computer readable media 1120 may be computer readable storage media 1124 or computer readable signal media 1126. Computer readable storage media 1124 may include, for example, an optical or magnetic disk that is inserted or placed into a drive or other device that is part of persistent storage 1108 for transfer onto a storage device, such as a hard drive, that is part of persistent storage 1108.

Computer readable storage media 1124 also may take the form of a persistent storage, such as a hard drive, a thumb drive, or a flash memory, that is connected to data processing system 1100. In some instances, computer readable storage media 1124 may not be removable from data processing system 1100. In these examples, computer readable storage media 1124 is a physical or tangible storage device used to store program code 1118 rather than a medium that propagates or transmits program code 1118. Computer readable storage media 1124 is also referred to as a computer readable tangible storage device or a computer readable physical storage device. In other words, computer readable storage media 1124 is a media that can be touched by a person.

Alternatively, program code 1118 may be transferred to data processing system 1100 using computer readable signal media 1126. Computer readable signal media 1126 may be, for example, a propagated data signal containing program code 1118. For example, computer readable signal media 1126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 1118 may be downloaded over a network to persistent storage 1108 from another device or data processing system through computer readable signal media 1126 for use within data processing system 1100. For instance, program code stored in a computer readable storage medium in a server data processing system may be downloaded over a network from the server to data processing system 1100. The data processing system providing program code 1118 may be a server computer, a client computer, or some other device capable of storing and transmitting program code 1118.

The different components illustrated for data processing system 1100 are not meant to provide architectural limitations to the manner in which different embodiments may be implemented. The different advantageous embodiments may be implemented in a data processing system including components in addition to or in place of those illustrated for data processing system 1100. Other components shown in FIG. 11 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1104 may take the form of a hardware unit that has circuits that are manufactured or configured for a particular use. This type of hardware may perform operations without needing program code to be loaded into a memory from a storage device to be configured to perform the operations.

For example, when processor unit 1104 takes the form of a hardware unit, processor unit 1104 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 1118 may be omitted, because the processes for the different embodiments are implemented in a hardware unit.

In still another illustrative example, processor unit 1104 may be implemented using a combination of processors found in computers and hardware units. Processor unit 1104 may have a number of hardware units and a number of processors that are configured to run program code 1118. With this depicted example, some of the processes may be implemented in the number of hardware units, while other processes may be implemented in the number of processors.

In another example, a bus system may be used to implement communications framework 1102 and may be comprised of one or more buses, such as a system bus or an input/output bus. Of course, the bus system may be implemented using any suitable type of architecture that provides for a transfer of data between different components or devices attached to the bus system.

Thus, the different advantageous embodiments provide a method and apparatus for displaying aircraft information. In one advantageous embodiment, a selection of a piece of dynamic information about an aircraft on a first display in a user interface is detected. The piece of dynamic information is used to operate the aircraft and changes during the operation of the aircraft. The piece of dynamic information selected from the first display is added to a custom display in the user interface. The custom display is displayed in the user interface on a display system for the aircraft.

In this manner, the different advantageous embodiments provide a system for viewing desired aircraft information more efficiently and more quickly as compared to currently-available systems. Further, the different advantageous embodiments provide a system that allows desired aircraft information to be viewed in a single display device without reducing the readability of the desired aircraft information.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for displaying aircraft information, the method comprising:

detecting, by a processor unit, a plurality of selections of pieces of dynamic information about an aircraft on a plurality of displays on a user interface, wherein the pieces of dynamic information are used to operate the aircraft and change during operation of the aircraft;

adding, by the processor unit, the pieces of dynamic information selected from the plurality of displays to a custom display on the user interface;

displaying the custom display on the user interface on a display system for the aircraft;

determining, by the processor unit, whether a number of selected events have occurred during the operation of the aircraft, wherein the number of selected events include at least one of a selected speed for the aircraft, a beginning of a selected phase of flight for the aircraft, an alert being generated, a notification being received from a ground station, and landing gear being deployed; and storing, by the processor unit, screenshots of the custom display during the operation of the aircraft in response to a determination that any of the number of selected events has occurred.

2. The method of claim 1 further comprising:
identifying a set of functions for the pieces of dynamic information selected; and
adding the set of functions to the custom display.

3. The method of claim 1 further comprising:
displaying values for the pieces of dynamic information on the custom display, wherein the values were stored during the operation of the aircraft.

4. The method of claim 1, wherein a number of pieces of dynamic information about the aircraft from a number of different displays is present in the custom display in addition to the pieces of dynamic information from the plurality of displays.

5. The method of claim 1, wherein the display system is located on at least one of the aircraft and a location remote to the aircraft.

6. The method of claim 1 further comprising:
storing values for the pieces of dynamic information during the operation of the aircraft.

7. The method of claim 1, wherein displaying the custom display on the user interface on the display system for the aircraft comprises:
displaying the custom display on the user interface on the display system for the aircraft during the operation of the aircraft, wherein the plurality of selections are made by an operator via a number of user input devices during the operation of the aircraft.

8. The method of claim 1 further comprising:
storing the custom display for use at a subsequent time.

9. The method of claim 1, wherein the pieces of dynamic information about the aircraft are selected from one of an engine temperature, a fuel use, an altitude, a position of a control surface, cabin temperature, hydraulic pressure, and a fuel level.

10. The method of claim 1, wherein the plurality of displays are for systems in the aircraft selected from a hydraulic system, a fuel system, an electrical system, a landing gear system, a control surface system, a sensor system, and an environmental system.

11. An apparatus comprising:
a display system for an aircraft; and
a computer system configured to detect a plurality of selections of pieces of dynamic information about the aircraft on a plurality of displays on a user interface, wherein the pieces of dynamic information are used to operate the aircraft and change during operation of the aircraft; add the pieces of dynamic information selected from the plurality of displays to a custom display on the user interface; display the custom display on the user interface on the display system for the aircraft; determine whether a number of selected events have occurred during the operation of the aircraft, wherein the number of selected events include at least one of a selected speed for the aircraft, a beginning of a selected phase of flight for the aircraft, an alert being generated, a notification being received from a ground station, and landing gear being deployed; and store screenshots of the custom display during the operation of the aircraft in response to a determination that any of the number of selected events has occurred.

12. The apparatus of claim 11, wherein the computer system is further configured to identify a set of functions for the pieces of dynamic information; and add the set of functions to the custom display.

13. The apparatus of claim 11, wherein the computer system is further configured to display values for the pieces of dynamic information on the custom display, wherein the values were stored during the operation of the aircraft.

14. The apparatus of claim 11, wherein a number of pieces of dynamic information about the aircraft from a number of different displays is present in the custom display in addition to the pieces of dynamic information from the plurality of displays.

15. The apparatus of claim 11, wherein the display system is located on at least one of the aircraft and a location remote to the aircraft.

16. The apparatus of claim 11, wherein the computer system is further configured to store values for the pieces of dynamic information during the operation of the aircraft.

17. The apparatus of claim 11, wherein in being configured to display the custom display on the user interface on the display system for the aircraft, the computer system is configured to display the custom display on the user interface on the display system for the aircraft during the operation of the aircraft, wherein the plurality of selections are made by an operator via a number of user input devices during the operation of the aircraft.

18. A custom display system for an aircraft, the custom display system comprising:
a display system for the aircraft; and
a computer system configured to detect a plurality of selections of pieces of dynamic information about the aircraft on a plurality of displays on a user interface, wherein the pieces of dynamic information are used to operate the aircraft and change during operation of the aircraft; add the pieces of dynamic information selected from the plurality of displays to a custom display on the user interface, wherein a number of pieces of dynamic information about the aircraft from a number of different displays is present in the custom display in addition to the pieces of dynamic information from the plurality of displays; identify a set of functions for the pieces of dynamic information; add the set of functions to the custom display; display the custom display on the user interface on the display system for the aircraft; determine whether a number of selected events have occurred during the operation of the aircraft, wherein the number of selected events include at least one of a selected speed for the aircraft, a beginning of a selected phase of flight for the aircraft, an alert being generated, a notification being received from a ground station, and landing gear being deployed; and store screenshots of the custom display during the operation of the aircraft in response to a determination that any of the number of selected events has occurred.

\* \* \* \* \*